United States Patent
Luo

(10) Patent No.: US 11,025,547 B2
(45) Date of Patent: Jun. 1, 2021

(54) ENHANCED NETWORK STACK

(71) Applicant: VMware, Inc., Palo Alto, CA (US)

(72) Inventor: Louis Luo, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 12 days.

(21) Appl. No.: 16/248,572

(22) Filed: Jan. 15, 2019

(65) Prior Publication Data
US 2020/0228451 A1    Jul. 16, 2020

(51) Int. Cl.
| | | |
|---|---|---|
| *H04L 12/803* | (2013.01) |
| *G06F 9/455* | (2018.01) |
| *H04L 12/26* | (2006.01) |
| *H04L 12/935* | (2013.01) |
| *H04L 12/861* | (2013.01) |
| *H04L 12/931* | (2013.01) |

(52) U.S. Cl.
CPC ........ *H04L 47/125* (2013.01); *G06F 9/45558* (2013.01); *H04L 43/10* (2013.01); *H04L 49/3063* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2003/0043841 A1* | 3/2003 | Jones | H04L 12/4625 370/449 |
| 2006/0133369 A1* | 6/2006 | Zhang | H04L 69/12 370/389 |
| 2008/0235690 A1* | 9/2008 | Ang | G06F 9/526 718/102 |
| 2012/0131376 A1* | 5/2012 | Khawer | H04W 24/04 714/4.11 |

(Continued)

*Primary Examiner* — Jay L Vogel
(74) *Attorney, Agent, or Firm* — Adeli LLP

(57) ABSTRACT

Some embodiments of the invention provide a new networking data path framework that employs one or more dedicated kernel threads to process network traffic on a host computer executing multiple machines (such as virtual machines or containers). This new framework is referred to as an Enhanced Networking Stack (ENS) in this document. In some embodiments, the dedicated kernel threads execute on dedicated CPU cores (e.g., one kernel thread per CPU core) to proactively poll physical NICs (PNICs) of the host computer and virtual NICs (VNICs) of the machines (e.g., VMs), and to perform packet processing operations on packets received by the host and packets transmitted by the machines. In some embodiments, each PNIC or VNIC is associated with one dedicated kernel thread, in order to avoid synchronization issues between the kernel threads. In the discussion below, these kernel threads are referred to as fast-path packet processing threads or as logical cores, or Lcores, and the physical and virtual NICs that are polled by the Lcores are referred to as polled network devices. In some embodiments, one Lcore can process multiple polled network devices. This is beneficial because in some embodi- (Continued)

ments one CPU core is dedicated to each Lcore (i.e., because one Lcore monopolizes the entire computing power of one CPU core), and it would be wasteful to dedicate one Lcore to just one polled network device, which might be under-utilized.

18 Claims, 9 Drawing Sheets

(56) References Cited

U.S. PATENT DOCUMENTS

| | | | | |
|---|---|---|---|---|
| 2014/0351396 | A1* | 11/2014 | Stabile | H04L 41/12 709/223 |
| 2016/0182279 | A1* | 6/2016 | Gong | H04L 41/12 370/254 |
| 2017/0329644 | A1* | 11/2017 | Imamura | F21V 21/03 |
| 2019/0272002 | A1* | 9/2019 | Seenappa | G06F 1/08 |

* cited by examiner

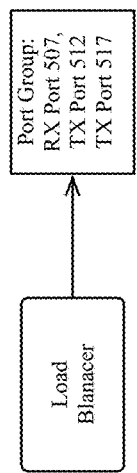
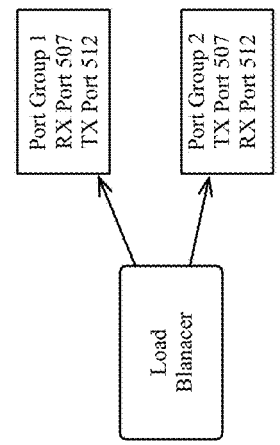
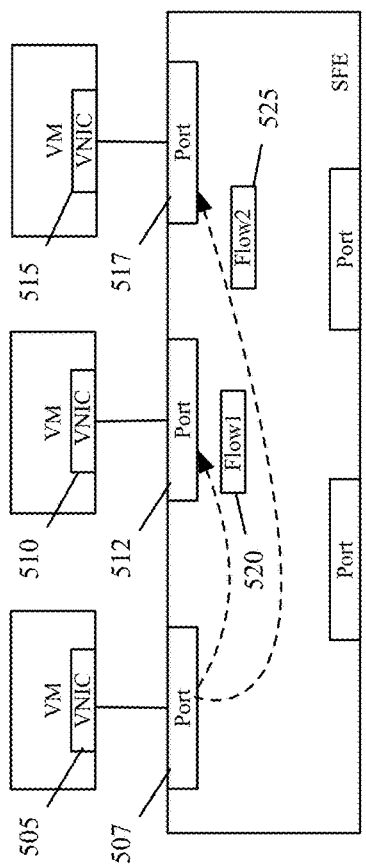
*Figure 5*
*Figure 6*

ENHANCED NETWORK STACK

BACKGROUND

In recent years, there has been a dramatic increase in the number datacenters that have host computers execute multiple machines (e.g., virtual machines and/or containers). These host computers often execute virtual switches that allow these machines to communicate with each other and to share one or more physical network interfaces of the host computers. They also execute virtual routers and middlebox service machines or modules that perform L3 routing and/or middlebox service operations on the host computers. As these virtual switches/routers and middlebox machines/modules can serve as bottlenecks for the packets being processed, it is highly desirable to have an improved architecture for increasing the speed at which these virtual switches/routers and middlebox machines/modules execute on the host computers.

BRIEF SUMMARY

Some embodiments of the invention provide a new networking data path framework that employs one or more dedicated kernel threads to process network traffic on a host computer executing multiple machines (such as virtual machines or containers). This new framework is referred to as an Enhanced Networking Stack (ENS) in this document. In some embodiments, the dedicated kernel threads execute on dedicated CPU cores (e.g., one kernel thread per CPU core) to proactively poll physical NICs (PNICs) of the host computer and virtual NICs (VNICs) of the machines (e.g., VMs), and to perform packet processing operations on packets received by the host and packets transmitted by the machines.

In some embodiments, each PNIC or VNIC is associated with one dedicated kernel thread, in order to avoid synchronization issues between the kernel threads. In the discussion below, these kernel threads are referred to as fast-path packet processing threads or as logical cores, or Lcores, and the physical and virtual NICs that are polled by the Lcores are referred to as polled network devices. In some embodiments, one Lcore can process multiple polled network devices. This is beneficial because in some embodiments one CPU core is dedicated to each Lcore (i.e., because one Lcore monopolizes the entire computing power of one CPU core), and it would be wasteful to dedicate one Lcore to just one polled network device, which might be underutilized.

In some embodiments, interrupts are disabled on CPU cores that execute the Lcores, in order to reduce context switching costs. Also, in some embodiments, the Lcores are implemented by an ENS software forwarding element (e.g., a software switch or router) that executes on the host computer. The ENS software forwarding element (SFE) has ports associated with the VNICs and PNIC(s). These SFE ports are polled by the Lcores to identify any packets received from the VNICs or PNIC(s). As one Lcore is assigned to each VNIC or PNIC, an SFE port associated with a VNIC or a PNIC is polled by only the Lcore associated with the VNIC or PNIC.

The enhanced network stack of some embodiments uses a load balancing process to distribute the incoming and outgoing network traffic (e.g., to distribute the PNICs and VNICs) across the Lcores in order to maximize overall throughput through the stack (e.g., of the ENS switch) while efficiently (e.g., maximally) utilizing the CPU core power of the Lcores in the communication process. Specifically, an Lcore's processing throughput is limited by the upper limit on the computing power of its associated physical core. When one Lcore polls too many polled network devices, the overall throughput of those polled devices is bounded (or bottlenecked) by the maximum power of that Lcore's associated CPU core, i.e., no matter how much traffic passes through the polled network devices, the associated CPU core of the Lcore polling those network devices can handle only a certain amount of traffic at maximum and all the extra traffic has to be dropped. Accordingly, to achieve a high throughput across the enhanced network stack, some embodiments employ the load balancing process to distribute the polled network devices across multiple Lcores in a load balanced manner, such that more threads can be involved in the communication process and each CPU's computing power can be maximally utilized.

The load balancing process in some embodiments is a dynamic load balancing process that allows VNICs and/or PNIC(s) to be re-assigned to different Lcores as traffic conditions change. Each VNIC or PNIC can be permanently associated with one Lcore, i.e., can be statically pinned to an Lcore. This works fine in a small-scale deployment environment, especially for use cases in which the users are willing to obtain guaranteed low latency or low packet drop rate by trading off the overall throughput. However, in other use cases, a static pinning scheme does not work well, such as in large and dynamic environments or in environments in which the users care more about overall throughput. For this reason, the enhanced network stack of some embodiments uses a dynamic load balancing process to achieve better overall performance.

In some embodiments, the dynamic load balancer of the enhanced network stack periodically executes the ENS load balancing process. In each execution iteration, the load balancing process collects the dispatch statistics from the ENS, and constructs a communication graph among the ports. Based on this graph, the load balancer divides the active ports into groups. Once the groups are created, ENS load balancer iterates over the ports of each group and places them on the Lcore that is best based on a certain set of criteria. In some embodiments, each available Lcore is evaluated by computing the overall cost of placing the port on this Lcore. For each port, the Lcore with the minimum cost will be selected as the best Lcore. In the cost calculation, the load balancing process of some embodiments considers four cost factors, i.e., communication cost, stability cost, polling affinity cost, and the device affinity cost. Some of these cost factors address the problems mentioned above, and others provide features like stability and superior throughput.

The affinity costs in some embodiments account for multi-socket architecture placements. Modern servers with two or more processors often employ architectures with multiple sockets, each with processor cores, memory, etc., that operate on a single motherboard. Some multi-socket architectures use a non-uniform memory architecture (NUMA) for memory access by the multiple processors of the multiple sockets. NUMA allows for processors on the different sockets to have access to a memory local to the socket, while also providing access to a shared pool of memory (e.g., the local memory of other sockets).

The memory access times for the processor cores of the different sockets varies depending on the location of the memory relative to the socket (e.g., local memory accesses are faster than remote memory accesses). Accessing memory directly attached to the socket is faster than accessing memory in remote sockets because there is a performance penalty when traversing inter-CPU links (e.g., Intel QuickPath Interconnect (QPI)) to access memory in a remote socket. When VMs and PNICs operate on NUMA nodes different from the Lcores that process their traffic, the ENS packet-processing performance is severely jeopardized. Accordingly, the load balancing process of some embodiments use affinity scores to better align the VM and PNICs with Lcore on the same NUMA node.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 5 and 6 presents examples of creating port groups.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a new networking data path framework that employs one or more dedicated kernel threads to process network traffic on a host computer executing multiple machines (such as virtual machines or containers). This new framework is referred to as an Enhanced Networking Stack (ENS) in this document. In some embodiments, the dedicated kernel threads execute on dedicated CPU cores (e.g., one kernel thread per CPU core) to proactively poll physical NICs (PNICs) of the host computer and virtual NICs (VNICs) of the machines (e.g., VMs), and to perform packet processing operations on packets received by the host and packets transmitted by the machines.

In some embodiments, each PNIC or VNIC is associated with one dedicated kernel thread, in order to avoid synchronization issues between the kernel threads. In the discussion below, these kernel threads are referred to as fast-path packet processing threads or as logical cores, or Lcores, and the physical and virtual NICs that are polled by the Lcores are referred to as polled network devices. In some embodiments, one Lcore can process multiple polled network devices. This is beneficial because in some embodiments one CPU core is dedicated to each Lcore (i.e., because one Lcore monopolizes the entire computing power of one CPU core), and it would be wasteful to dedicate one Lcore to just one polled network device, which might be underutilized. In some embodiments, interrupts are disabled on CPU cores that execute the Lcores, in order to reduce context switching costs.

As used in this document, packets refer to a collection of bits in a particular format sent across a network. One of ordinary skill in the art will recognize that the term packet is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 1:
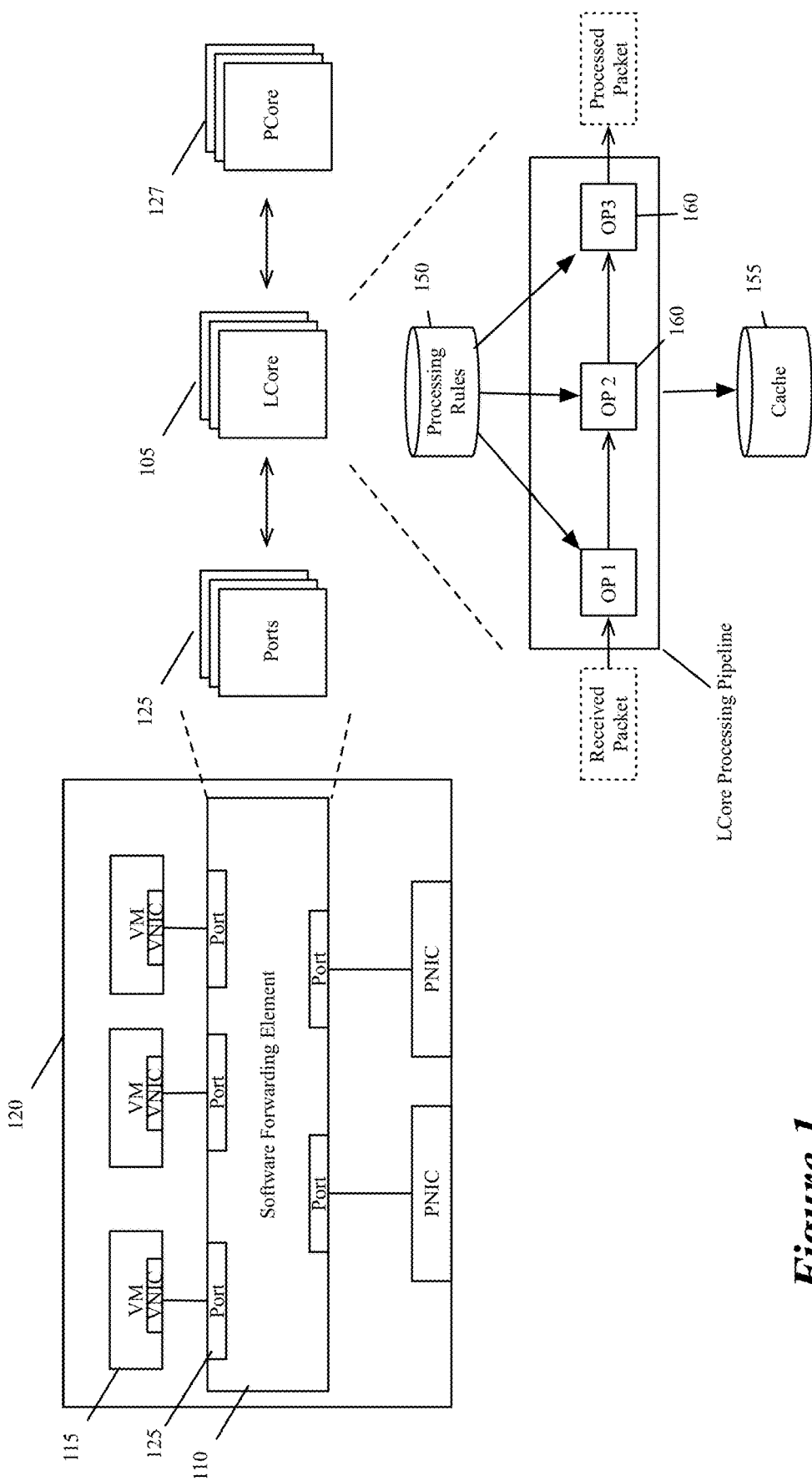
FIG. 1 illustrates an example of logical cores (Lcores) of some embodiments of the invention.

FIG. 1 illustrates an example of the Lcores of some embodiments of the invention. In this figure, the Lcores 105 are implemented by a software forwarding element 110 that executes on a host computer 120 along with a number of machines 115. The machines in this example are virtual machines (VMs), but in other embodiments the machines can be other data compute nodes, such as containers. The software forwarding element (SFE) 110 forwards data messages between the machines 115 on the host computer 120, and between these machines and devices/machines outside of the host computer 120 (e.g., between these machines and machines executing on other computers). In some embodiment, the SFE 110 is a software switch, while in other embodiments the SFE is a software router.

The enhanced network stack of the SFE 110 in some embodiments is implemented by instantiating one Lcore for each VNIC of each VM 115, and each PNIC of the host computer 120. In some embodiments, each Lcore is assigned to one processor core 127 (Pcore, e.g., one core of a multi-core microprocessor). Also, in some embodiments, the SFE has one port 125 for each VM VNIC or host PNIC. Each SFE port in some embodiments is associated with one Lcore 105. Through its association with an SFE port, each Lcore is associated with the VNIC or PNIC associated with the SFE port. In some embodiments, the transmit and receive sides (TX- and RX-sides) of an SFE port can be assigned to two different Lcores. Each Lcore polls its associated SFE port(s) to identify any packets received from the VNICs or PNIC(s) associated with the SFE port(s).

In this model, each SFE port is polled by only one Lcore that is associated with the port, or by two Lcores with one Lcore handling receive-side traffic for the port and the other Lcore handling the transmit-side traffic for the port. Assigning only one Lcore to each port, or to each traffic direction of the port, avoid synchronization issues between different Lcores. As mentioned above, one Lcore can process multiple polled network devices (e.g., multiple SFE ports associated with multiple VNICs or PNICs). This is beneficial because in some embodiments one CPU core is dedicated to each Lcore (i.e., because one Lcore monopolizes the entire computing power of one CPU core), and it would be wasteful to dedicate one Lcore to just one polled network device, which might be underutilized. In some embodiments, interrupts are disabled on CPU cores that execute the Lcores, in order to reduce context switching costs, as further described below.

As shown in FIG. 1, each Lcore performs a set of one or more packet processing operations on each packet flow. In some embodiments, such packet processing operations include layer 2 forwarding operation, in other embodiments these operations include layer 3 forwarding operations, and in yet other embodiments these operations include layers 2 and 3 forwarding operations. These operations in other embodiments include middlebox service operations (e.g., firewall operations, load balancing operations, etc.) or calls to modules or machines on the host computer to perform such middlebox service operations.

In some embodiments, an Lcore 105 performs one of more packet processing operations 160 on a first packet of a packet flow based on a set of rules (e.g., L2 and/or L3 forwarding rules, service rules, etc.) stored in one or more rule storages 150. For one or more of these operations, the Lcore 105 stores the result(s) of the operation(s) in one or more cache storages 155. Examples of such results include L2 or L3 forwarding decisions.

For packets in a flow after the first packet, the Lcore 105 in some embodiments first accesses the cache storage for a particular operation to determine whether it has cached the result of the operation for that flow, and if so, it performs the operation (e.g., the L2 or L3 forwarding operation) based on this cached result. Using the cached results serves as the Lcore's fast path processing, while performing the packet processing operations 160 by reference to processing rules 150 serves as the Lcore's slow path processing. In some embodiments, the cache storage 155, processing rules 150 and the packet processing operations 160 are in the kernel space. Each Lcore in some embodiments is a kernel space thread that does not have any user space address associated with it.

Figure 2:
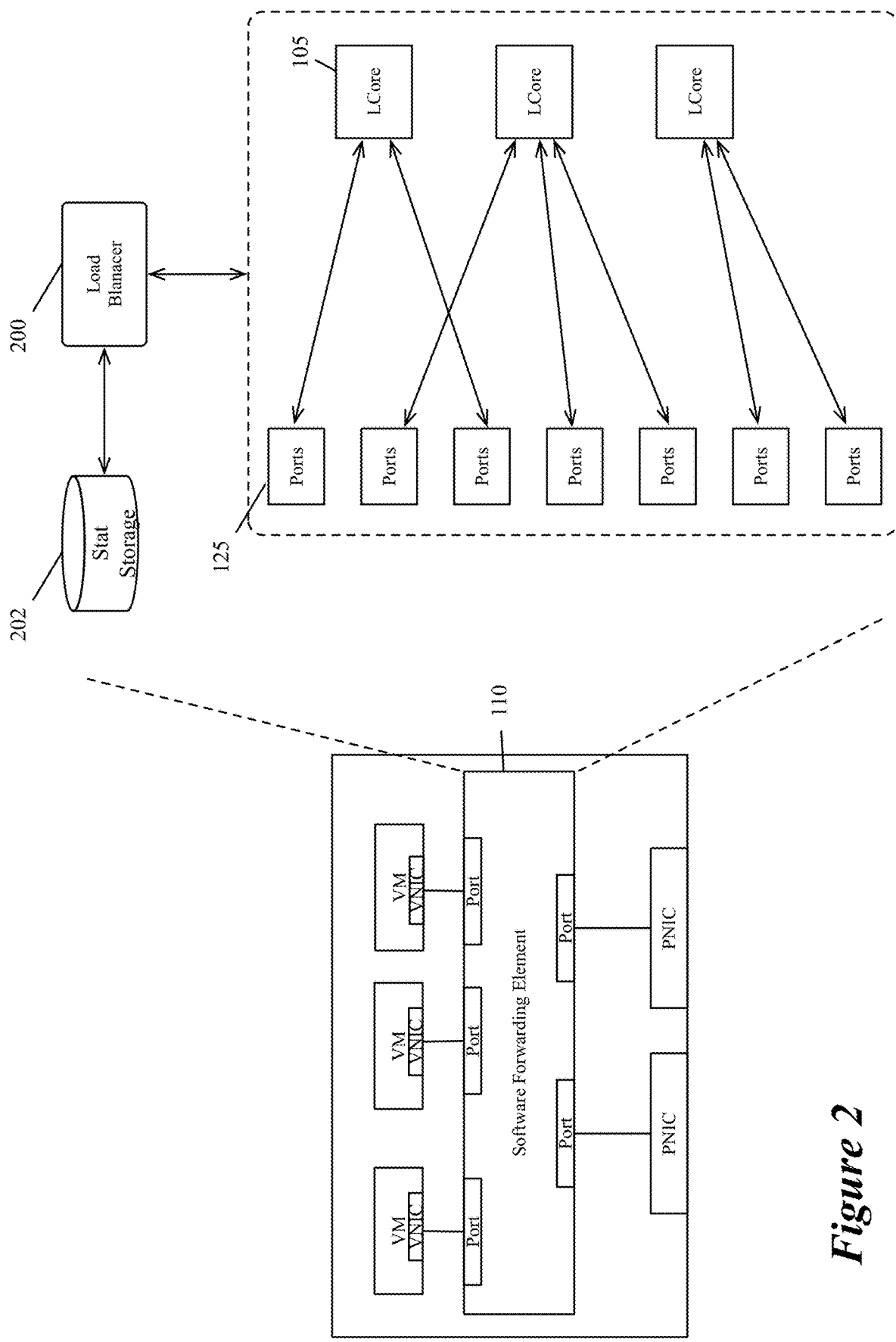
FIG. 2 illustrates that in some embodiments the software forwarding element has a load balancer to assign and dynamically re-assign Lcores to the forwarding element ports to distribute the incoming and outgoing network traffic (e.g., to distribute the PNICs and VNICs) across the Lcores.

FIG. 2 illustrates that in some embodiments the ENS SFE 110 has a load balancer 200 that assigns and dynamically re-assigns Lcores 105 to SFE ports 125 to distribute the incoming and outgoing network traffic (e.g., to distribute the PNICs and VNICs) across the Lcores. The load balancer's objective in some embodiments is to maximize overall throughput through the ENS stack while efficiently (e.g., maximally) utilizing the CPU core power of the Lcores in the communication process.

An Lcore's processing throughput is limited by the upper limit on the computing power of its associated physical core. When one Lcore polls too many polled network devices, the overall throughput of those polled devices is bounded (or bottlenecked) by the maximum power of that Lcore's associated CPU core, i.e., no matter how much traffic passes through the polled network devices, the associated CPU core of the Lcore polling those network devices can handle only certain amount of traffic at maximum and all the extra traffic has to be dropped. Accordingly, to achieve a high throughput across the enhanced network stack, the SFE in some embodiments uses the load balancer 200 to distribute the polled network devices across multiple Lcores in a load balanced manner, such that more threads can be involved in the communication process and each CPU's computing power can be maximally utilized.

The load balancing process in some embodiments is a dynamic load balancing process that allows VNICs and/or PNIC(s) to be re-assigned to different Lcores as traffic conditions change. Each VNIC or PNIC can be permanently associated with one Lcore, i.e., can be statically pinned to an Lcore. This works fine in a small-scale deployment environment, especially for use cases in which the users are willing to obtain guaranteed low latency or low packet drop rate by trading off the overall throughput. However, in other use cases, a static pinning scheme does not work well, such as in large and dynamic environments or in environments in which the users care more about overall throughput. For this reason, the enhanced network stack of some embodiments uses a dynamic load balancing process to achieve better overall performance.

In some embodiments, the load balancer 200 periodically executes its load balancing process. In each execution iteration, the load balancing process collects from the SFE 110 dispatch statistics from the SFE's statistics storage 202. By analyzing these statistics, the load balancer can identify the load on each Lcore (e.g., the number of packets processed by each Lcore, the number of flows processed by each flow, the number of packets/flows passing through each SFE port associated with the Lcore, etc.). Based on the collected statistics, the load balancer constructs a communication graph among the ports. Based on this graph, the load balancer divides the active ports into groups.

Once the groups are created, the load balancer 200 iterates over the ports of each group and places them on the Lcore that is best based on a certain set of criteria. In some embodiments, each available Lcore is evaluated by computing the overall cost of placing the port on this Lcore. For each port, the Lcore with the minimum cost will be selected as the best Lcore. In the cost calculation, the load balancing process of some embodiments considers four cost factors, i.e., communication cost, stability cost, polling affinity cost, and the device affinity cost. Some of these cost factors address the problems mentioned above, while others provide features like stability and superior throughput.

The affinity costs in some embodiments account for multi-socket architecture placements in some embodiments. Modern servers with two or more processors often employ architectures with multiple sockets, each with processor cores, memory, etc., that operate on a single motherboard. Some multi-socket architectures use a non-uniform memory architecture (NUMA) for memory access by the multiple processors of the multiple sockets. NUMA allows for processors on the different sockets to have access to a memory local to the socket, while also providing access to a shared pool of memory (e.g., the local memory of other sockets).

Figure 3:
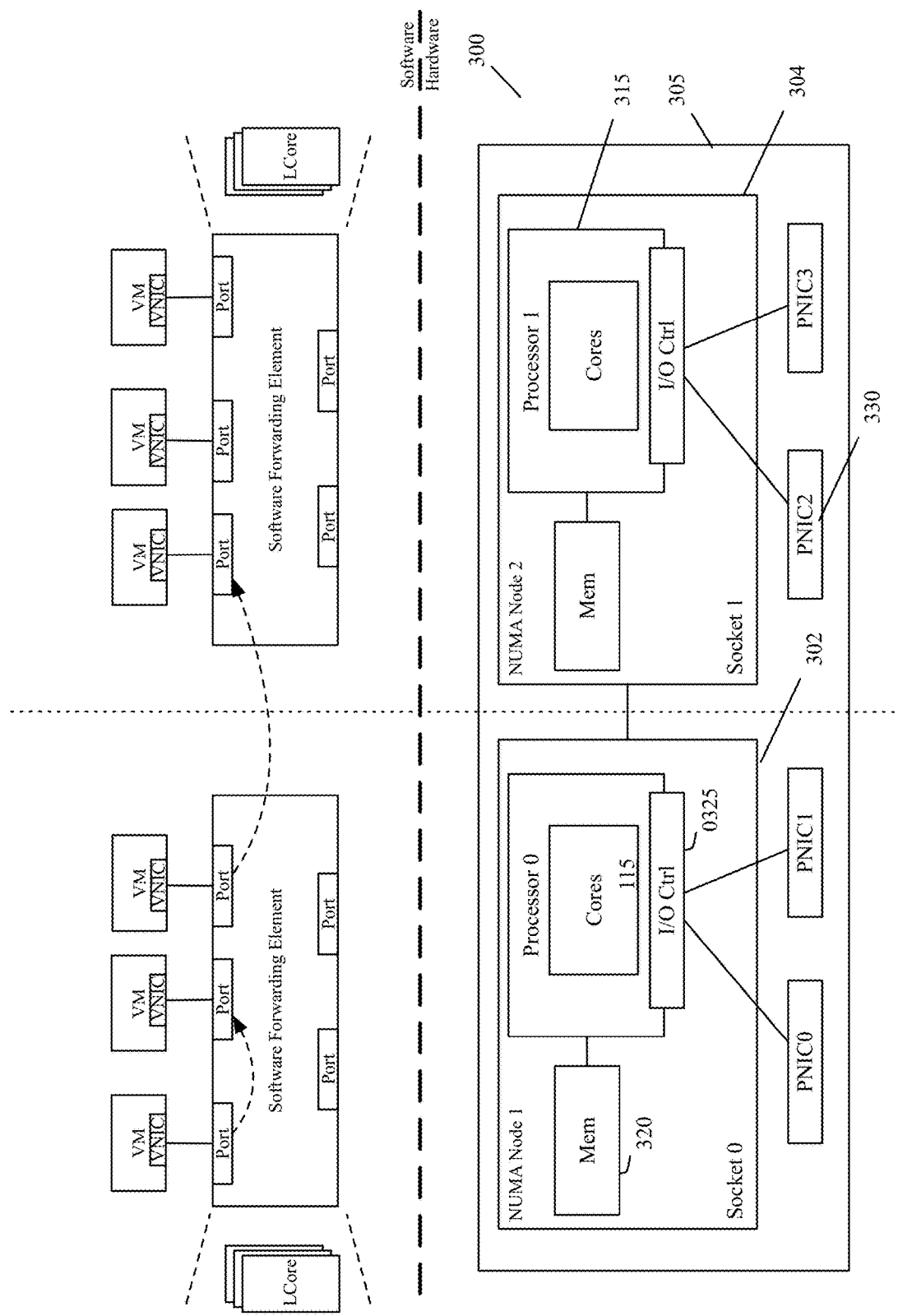
FIG. 3 illustrates an example of the NUMA architecture that associates multiple VMs on a host computer with different processors and memories on different sockets on the computer.

FIG. 3 illustrates an example of the NUMA architecture 300 that associates multiple VMs on a host computer 305 with different processors and memories on different sockets on the computer 305. In this example, the host computer 305 has two NUMA nodes 302 and 304 on two different sockets. As shown, each NUMA node includes a multi-core processor 315, a memory 320, I/O circuitry 325, and several PNICs 330. This figure also shows one SFE and several VMs operating on each NUMA node. Each SFE is illustrated to include several Lcores.

In a NUMA architecture, the memory access times for the processor cores of the different sockets varies depending on the location of the memory relative to the socket (e.g., local memory accesses are faster than remote memory accesses). Accessing memory directly attached to the socket is faster than accessing memory in remote sockets because there is a performance penalty when traversing inter-CPU links (e.g., Intel QuickPath Interconnect (QPI)) to access memory in a remote socket. When VMs and PNICs operate on NUMA nodes different from the Lcores that process their traffic, the ENS packet-processing performance is severely jeopardized. Accordingly, the load balancing process of some embodiments use affinity scores to better align the VM and PNICs with Lcore on the same NUMA node.

Figure 4:
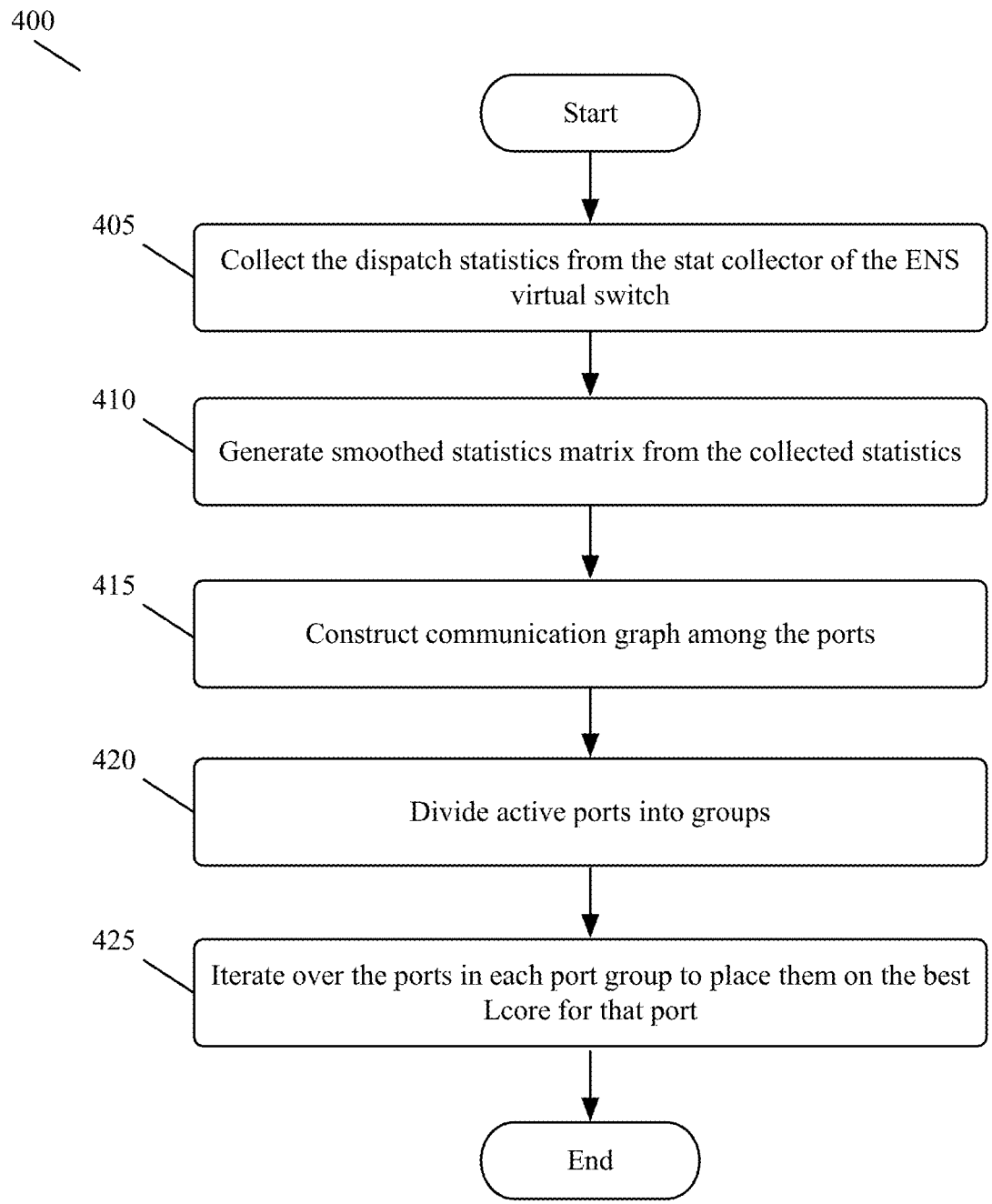
FIG. 4 illustrates a load-balancing process of the load balancer in some embodiments.

FIG. 4 illustrates a load-balancing process 400 of the load balancer 200 in some embodiments. As mentioned above, the load balancer 200 executes this process 400 at regular intervals (e.g., periodically every four seconds) in some embodiments. This process 400 constructs a communication graph to express the communication between different ports of the SFE 110 based on statistics that have been collected during the prior interval. As mentioned above, the SFE is a software switch (also called a virtual switch) in some embodiments. Based on the constructed graph, the load balancer divides the active ports into groups, and iterates over the ports of each group to place them on the Lcore that is best based on a certain set of criteria.

As shown, the process 400 initially collects (at 405) the dispatch statistics from a statistic collector of the SFE 110. These statistics in some embodiments are organized in a two-dimensional matrix with port numbers as the indices. For example, a non-zero entry M(i,j) in this matrix indicates that port[i] has been sending traffic to port[j] recently. In some embodiments, the ENS virtual switch can handle a VNIC port's egress and ingress paths (i.e., the TX/RX paths) with different Lcores. Therefore, the communication graph in some embodiments is a uni-directional graph.

In some embodiments, the network traffic is modeled as a stochastic process, with expected random fluctuation. To avoid abrupt change on statistics due to traffic fluctuation, the load-balancing process 400 generates (at 410) a smoothed statistics matrix from the collected statistics matrix (i.e., the matrix collected at 405) by applying a smoothing function to each entry M(i,j) in the collected matrix to obtain a smoothed value entry M'(i,j). For instance, some embodiments use the following smoothing function $$M'(i,j)=M(i,j)+g\times\text{delta},$$

where $$\text{delta}=\text{Traffic}_{i\to j}-M(i,j),$$

and g is a constant (e.g., a fraction between 0 and 1) and $\text{Traffic}_{i\to j}$ is the sum of all M(i,j) collected for ports i and j over a duration of time (e.g., over a time period in which the load-balancing process 400 executes several times). This smoothing function essentially prevents any one sample value for a particular pair of ports from dramatically changing the value that is used for the port pair at any given time. The dispatch statistics matrix can be considered as an adjacency matrix.

Based on the statistics, the load balancing process 400 constructs (at 415) a communication graph among the ports. Using this graph, the load balancer divides (at 420) the "active" ports into groups. In some embodiments, ports are "active" when the ports have non-zero entries in the statistics matrix on their rows and columns. To divide the active ports into port groups, the load balancing process 400 in some embodiments considers (at 420) the relationship among communication paths between different pairs of ports (e.g., the edges in the communication graph).

FIG. 5 presents an example to illustrate this. In this example, VNIC 505 is in communication sessions with VNIC 510 and VNIC 515 during a particular time interval, and for these sessions, it sends packet flows 520 and 525 to VNIC 510 and VNIC 515 during this time interval. In this example, the communication paths between VNICs 505 and 510 and between VNICs 505 and 515 are correlated because the egress data path of VNIC 505 is handled by one Lcore. Specifically, in some embodiments, the same Lcore will process the traffic from VNIC 505 to VNIC 510 as well as the traffic from VNIC 505 to VNIC 515, because only one Lcore will handle the egress data path of a VNIC. Also, the correlation between the egress paths from VNIC 505 to VNICs 510 and 515 puts constraints on the association of these VNICs (i.e., the association of the virtual switch ports connected to these VNICs) and the Lcores. Hence, the load balancing process 400 groups the virtual switch ports 507, 512 and 517 connected to these VNICs 505-515 together.

FIG. 6 presents another example to illustrate how the load balancing process 400 considers relationship between communication paths. In this example, the VNIC 505 still sends packet to the VNIC 510 (as in the example for FIG. 5), but the VNIC 505 does not send packet to the VNIC 515. Instead, the second packet flow 610 in this example is from VNIC 510 back to VNIC 505. In some embodiments, the two flows 605 and 610 between VNICs 505 and 510 (i.e., the flow 605 from VNIC 505 to VNIC 510, and the flow 610 from VNIC 510 to VNIC 505) are independent, because the transmit and receive paths of these two VNICs 505 and 510 (i.e., the receive and transmit paths of their associated ports 507 and 512) can be handled by different Lcores.

Thus, given that two different Lcores can handle the two ports 507 and 512, the load balancing process 400 in some embodiments can divide the two ports 507 and 512 of the virtual switch into two port groups (port group 1 including the receive-side of port 507 and transmit-side of port 512, and port group 2 including the transmit-side of port 507 and receive-side of port 512) to reduce the size of each group (as well as the complexity of the placement algorithm). In these embodiments, the notation of transmit- and receive-side for a port is from the perspective of the VNIC or PNIC connected to the port, meaning the RX-side of the port reflects direction of flow received at the port from the VNIC/PNIC, while TX-side of the port reflects direction of the flow from the port to the VNIC/PNIC.

Once the port groups are created, the load balancing process 400 iterates (at 425) over the ports in each port group to place them on the "best" Lcore. For each port, the process iterates over all available Lcores and calculates the cost of placing the port on each Lcore by combining a set of one or more costs. The Lcore with the minimum cost will be selected for the port. In some embodiments, this operation is done for both the transmit-side (TX-side) and receive-side (RX-side) of the port. The placement of the ports in each port group will be described further below. After 425, the process ends.

In some embodiments, the "best" placement is treated as an NP-Complete problem, and hence the load balancing process uses a set of one or more heuristic considerations to identify the best Lcore for a port in a port group. For instance, in some embodiments, the load balancing process tries to provide more CPU power to ports with more traffic even thought this might generate sub-optimal performance compared with the optimal placements. To provide more CPU power to ports with more traffic, the load balancing process in some embodiments sorts the ports according to their traffic in descending order. The port with the most amount of traffic will be placed first. One exemplary way for selecting the best Lcore for a port will be further described below by reference to FIGS. 7-9.

To compute a cost for each Lcore and each port, the load balancing process in some embodiments considers four types of cost factors: the communication cost, the stability cost, the VM affinity cost (VM VNIC affinity cost), and the device affinity cost (computer PNIC affinity cost). Each of these costs has certain impact on the final placement decision. In some embodiments, the load balancing process uses weights to represent the relative importance or impacts of each cost.

Communication cost relates to the impact of sending traffic from one port to another. Suppose a port, P, sends packets to another port K, which has its transmit side TX assigned to Lcore f, where the transmit side TX is expressed from the virtual switch perspective, meaning port K receives packets to transmit to its VNIC or PNIC from another port. The communication cost evaluates the impact of sending traffic from port P to port K. Depending on the Lcore placement of port P's receive side and the Lcore placement of port K's transmit side, it may account for the cost to move the packets from port P's receive side queue to port K's transmit side queue when the transmit and receive sides are handled by the same Lcore f. If they are handled by two different Lcores, f and g, respectively, this cost may account for the effort for Lcore g to move the packets from port P's RX queue to the Lcore f's input queue, and Lcore f polls its input queue and pushes the packets to port K's TX queue, thus incurring queuing delays. In case the Lcores are pinned to different NUMA nodes, it may also account for the cost to move the packets from one NUMA node to another.

Accordingly, in some embodiments, the communication cost differentiates the following scenarios, with each scenario having a different weight in the cost calculation: (1) the two ports are placed on two Lcores executing on different NUMA nodes, (2) the two ports are placed on Lcores executing on the same NUMA node, and (3) the two ports are placed on the same Lcore. Among these scenarios, cross-NUMA communication will incur the highest overhead cost, so load balancing process assigns the largest weight to penalize any attempt to place two communicating ports on different Lcores that are located on different NUMA nodes. This penalization does not necessarily prohibit such cross-NUMA placement. Depending on the amount of traffic between the source and destination ports as well as the existing port placements on the two NUMA nodes, cross-NUMA placement may indeed generate better throughput despite the high cross-NUMA cost.

Port-to-port communications that go through two different Lcores is referred to below as cross-Lcore communications. For such communications, the load balancing process assesses a weight to account for the communications incurring queuing delays and the packets being processed by two different Lcores. The least overhead is incurred when the two communicating ports are handled by a single Lcore. For this type of communication, the load balancing process assigns the least weight in some embodiments.

Another factor that the load balancing process considers in some embodiments is that the CPU cycles that an Lcore spends in processing transmit-side and receive-side traffic are different. Depending on the actual traffic, the best placement of the ports that generates the maximum throughput may vary. Some embodiments evenly distribute among all the Lcores the transmit-side and receive-side of the ports. To achieve this goal, a port count weight is introduced to penalize the arrangement to place too many transmit-side or too many receive-side processing on a single Lcore.

Some embodiments model the communication costs of port u given a Lcore f as:

$$\text{Communication\_Cost}_{TX}(u, S, f) = \left(\sum_{v \in S} \alpha \cdot L(v, u)\right) + \beta \cdot f_{TX}$$

$$\text{Communication\_Cost}_{RX}(u, S, f) = \left(\sum_{v \in S} \alpha \cdot L(u, v)\right) + \beta \cdot f_{RX}$$

where S represents all the ports that have already been place, $\alpha$ represents affinity weight (cross NUMA or same NUMA), $\beta$ represents port count weight, L(v,u) represents traffic from v to u, and $f_{TX/RX}$ represents the number of transmit-side and receive-side port processings that have been placed on Lcore f.

When a port is attached to the ENS virtual switch, the virtual switch will place it on an Lcore. Later, when the load balancer decides whether it should migrate the port from the current Lcore to a new Lcore, it must consider the impact/cost of such a migration. Since each Lcore maintains its own cache, migrating a port means more cache misses during the process. Thus, frequent migration will cause severe throughput degradation. Accordingly, the load balancer in some embodiments uses stability cost to prevent unnecessary migrations.

Stability cost considers the topological relation between the current Lcore and the target Lcore (cross-NUMA vs same NUMA) and introduce a bias against migrating the port from one Lcore to another. However, depending on the weight chosen for stability, the stability cost may undesirably impede desirable migration of ports to different Lcores to achieve higher throughput. Accordingly, in some embodiments, the load balancer provides the ports with a chance to migrate (e.g., opportunistically) to another Lcore after having stayed on the current Lcore for long time.

To provide this chance, the load balancer maintains a stallCycles variable that is proportional to the time that a port has stayed on the current Lcore. In each load balancing cycle, if a port is migrated to a new Lcore, stallCycles is reset to zero; otherwise, it is incremented. The stability cost is then deduced by stallCycles to gradually reduce the impact of stability cost and eventually give the port a chance to migrate. Of course, this chance does not mean the port will indeed be moved to another Lcore. The final decision still depends on other cost factors. Given the considerations mentioned above, the load balancer in some embodiments models the stability cost of port u for its current Lcore f and new Lcore g as:

Stability_Cost$_{RX}(u,f,g)=\alpha \cdot$Egress$(u)$–stallCycles

Stability_Cost$_{TX}(u,f,g)=\alpha \cdot$Ingress$(u)$–stallCycles

Each VNIC-connected port belongs to the VNIC's VM, which may migrate among the NUMA nodes. The communication throughput of a port is jeopardized in some embodiments when the TX/RX Lcores are located on a different NUMA node as the NUMA node on which the VM executes.

Thus, it is beneficial to align the VM with the Lcore(s) that perform TX/RX on behalf of this VM's VNIC port(s). To achieve this goal, the load balancer in some embodiments considers the VM/Lcore alignment when it computes Lcore costs. For instance, based on the alignment, the load balancer in some embodiments uses a higher weight when the VM and Lcore are not on the same NUMA node. Specifically, when the VM and the costed Lcore are located on the same NUMA node, the load balancer uses a lower weight than when the VM and costed Lcore are located on different NUMA nodes.

In most deployments, the VNIC ports will communicate with some PNIC ports. In a multi-NUMA system, it is possible to install multiple PNICs (attached to different NUMA nodes) to gain higher throughput as well as better fault tolerance. Thus, it is desirable to align the Lcore with the PNIC that the VNIC port is communicating with. The cost calculation is the same as the above VM affinity cost, but with different device affinity weight.

Figure 7:
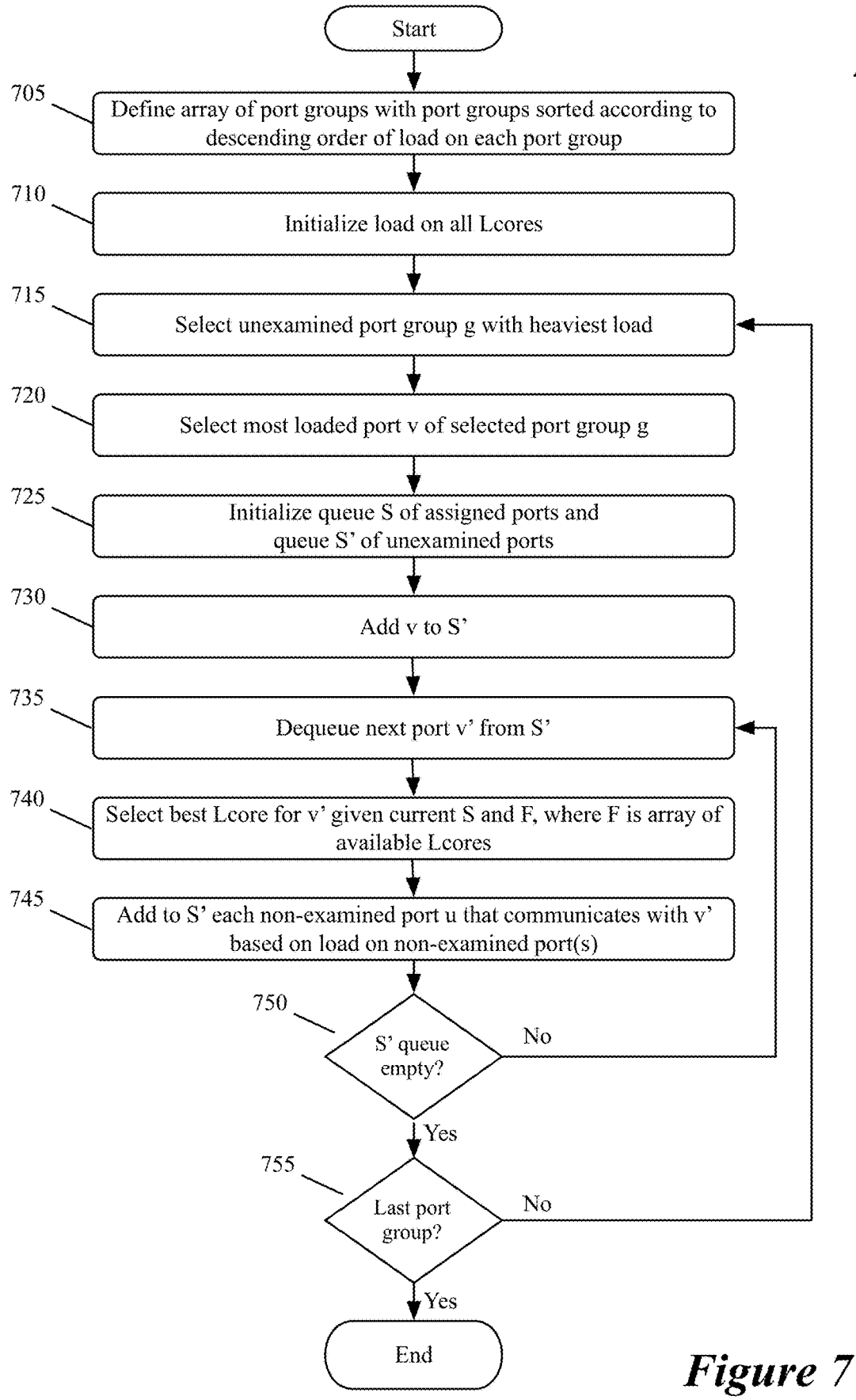
FIG. 7 illustrates a process that the load balancing process performs in some embodiments to iterate over the ports in each port group to place them on the best Lcore.

FIG. 7 illustrates a process 700 that the load balancing process 400 performs in some embodiments at 425 to iterate over the ports in each port group to place them on the best Lcore. As shown, the process 700 initially defines (at 705) an array of port groups with the port groups arranged in descending order of their load (i.e., with the port groups with the heavier load appearing before port groups with lighter loads). A port group's load is computed in some embodiments by summing the load on the ports within the group. As mentioned above, the load on the ports are expressed in different embodiments based on different metrics (e.g., number of flows passing through the ports, number of packets passing through the ports, etc.).

Next, at 710, the process resets the load on all the Lcores (e.g., sets the load on all the Lcores to zero). The process 700 then selects (at 715) a port group that has not yet been examined by the process 700 in this iteration of the load balancing process 400 and that has the heaviest load. In the array defined at 705, this port group is the topmost port group that has yet to be examined by the process 700 in this iteration. At 720, the process selects the most loaded port v of the port group g selected at 715.

At 725, the process then initializes two queues S and S'. The queue S is the queue of ports with assigned Lcores, while the queue S' is the queue of unexamined ports that have not yet been assigned to an Lcore. At 730, the process adds the port selected at 720 to the queue of unexamined ports. In some embodiments, the process 700 adds ports to the unexamined-port queue S' based on the load on the ports. For instance, when adding multiple ports to this queue, the process 700 in some embodiments sorts these ports based on a descending order of their loads and adds these ports to the end of the queue based on this sorted order. In these embodiments, the process 700 retrieves ports from the top of the queue. In this approach, a port that is retrieved after the first port might have less load than a later retrieved port, but this approach ensures a depth-first assignment of ports for the ports communicating with the heaviest port v and then for the subsequently assigned ports. In other embodiments, the process 700 uses other techniques for pushing and popping ports onto the queue S' (e.g., always popping the port with the heaviest load irrespective of when it was added).

At 735, the process 700 retrieves the port v' that is the next port to dequeue from the queue S'. In its first iteration through 735 for a particular iteration of the process 400, the process 700 in some embodiments retrieves the port v with the heaviest load that was selected at 720 and added to the queue S' at 730. In other iterations through 735, the process 700 selects the next port that is at the top of the queue S'.

Figure 8:
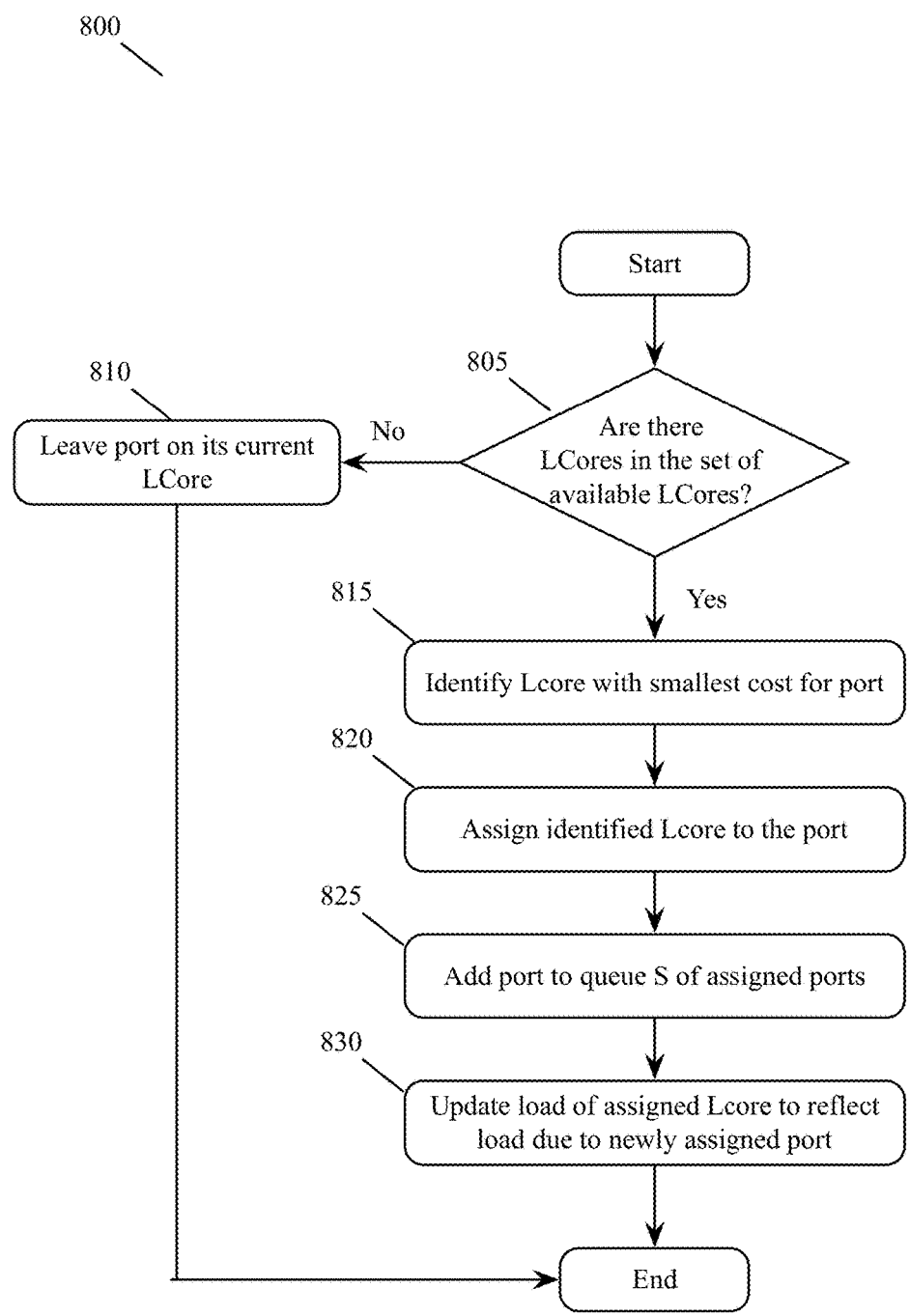
FIG. 8 illustrates the process that selects the best Lcore for a port.

After dequeuing the port v' from queue S', the process 700 calls (at 740) an Lcore-selection process 800 of FIG. 8 to select the best Lcore for the port v' given the current queue S of assigned ports and the array F of available Lcores. In some embodiments, when an Lcore reaches a threshold level (e.g., 90%, 95%, 100%, etc.) of usage, it is removed from the array F of available Lcores. The process 800 will be described below. After selecting the best Lcore for the dequeued port v', the process adds (at 745) to the end of the unexamined-port queue S' each port u that has been exchanging packets with the port v' and that has yet to be assigned an Lcore in this iteration of the process 700. When more than one such port exists, the process 700 sorts these ports according to a descending order of their loads and adds them to the end of the queue S'.

Next, at 750, the process 700 determines whether the unexamined-port queue S' is empty. If not, the process returns to 735 to select the next port v' from the top of the queue S', and to perform operations 740 and 745 for this newly selected port v'. When the unexamined-port queue S' is empty, the process determines (at 755) whether it has examined all the port groups. If not, the process returns to 715 to select an unexamined port group with the next highest load (i.e., the next port group in the port group array defined at 705). When the process 700 determines (at 755) that it has examined the last port group, the process ends.

FIG. 8 illustrates the process 800 that selects the best Lcore for a port at 740. As shown, the process 800 initially determines (at 805) whether the set F of available Lcores is empty (i.e., whether there are no available Lcores). If so, the process leaves (at 810) the port assigned to its current Lcore and ends. Otherwise, the process 800 performs (at 815) a process 900 of FIG. 9 to identify the lowest cost Lcore for the port given the current set S of assigned ports and the current set F of available Lcores. The process 900 will be further described below.

Next, the process 800 assigns (at 820) the lowest cost Lcore identified at 815 to the port, and then adds (at 825) the port to the set S of assigned ports. The process 800 then updates the load on the Lcore assigned at 820 to the port to reflect the load of the port. In some embodiments, the process adds the load of the port to the estimated load of the assigned Lcore. After 830, the process 800 then ends.

Figure 9:
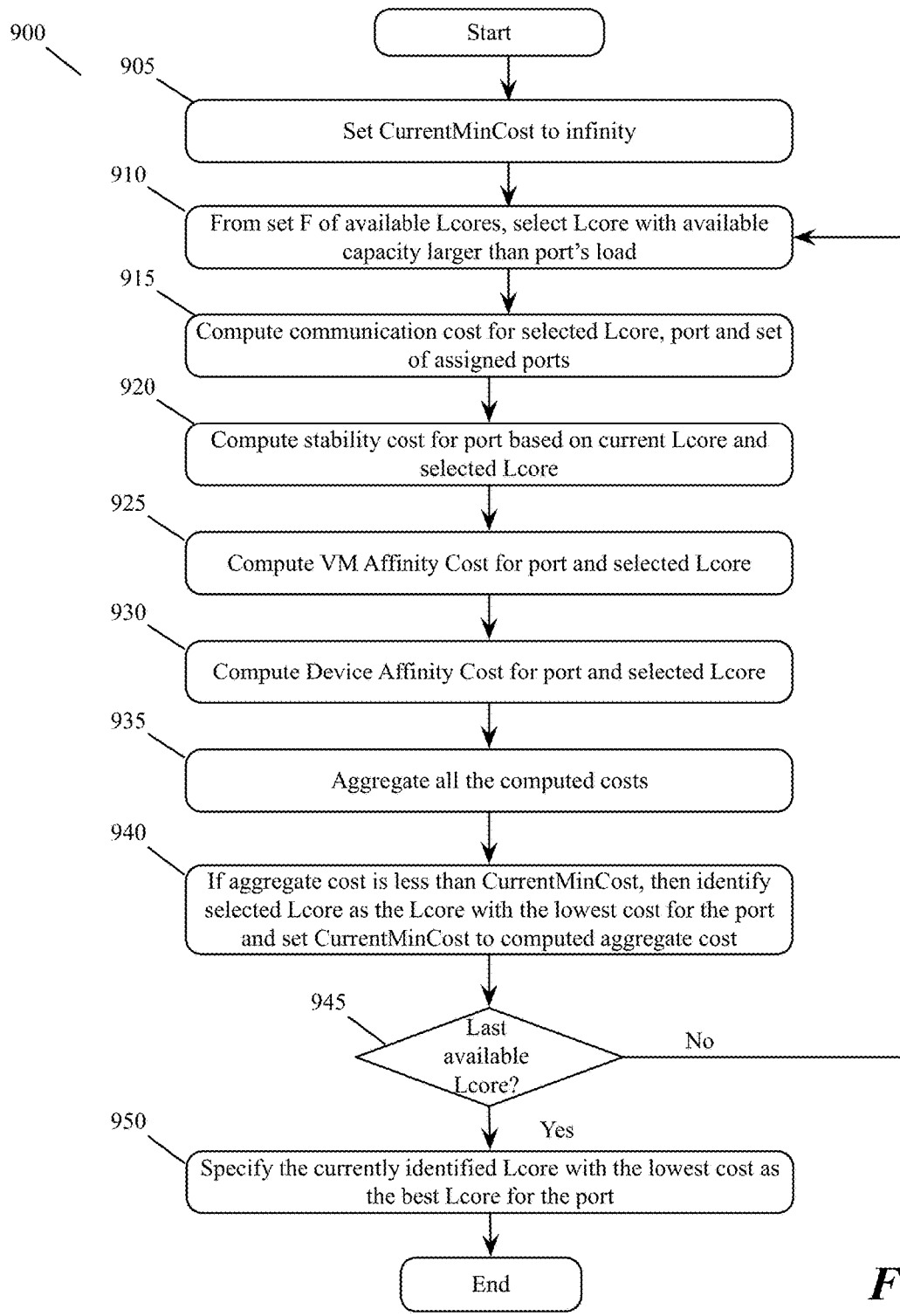
FIG. 9 illustrates the process to identify the lowest cost Lcore for a port given the current set S of assigned ports and the current set F of available Lcores.

FIG. 9 illustrates the process 900 to identify the lowest cost Lcore for a port given the current set S of assigned ports and the current set F of available Lcores. The load balancer performs this process in each of its iterations through 815 of the process 800. As shown, the process 900 starts by initializing (at 905) a variable, CurrentMinCost. In some embodiments, the process initializes this variable to a very large number, such as infinity or the largest numerical value available on the computer executing this process.

After setting this variable, the process 900 iterates through all available Lcores to compute their cost if they were to be assigned to the port. Specifically, at 910, the process 900 selects, from the set F of available Lcores, an Lcore with an available capacity that is larger than the port's current load (i.e., the load reflected in the statistics used for the current iteration of the load balancing process 700). From 915-930, the process then computes the four costs mentioned above, which are the communication cost, the stability cost, the VM affinity cost (VM VNIC affinity cost), and the device affinity cost (computer PNIC affinity cost). In some embodiments, the process 900 computes these costs according to the description of these costs above.

After computing these costs, the process 900 aggregates (at 935) all these costs, e.g., computes a sum of these costs, computes a weighted costs of these sums, etc. At 940, the process 900 identifies the Lcore selected at 910 as the lowest cost Lcore for the port when the aggregate cost computed at 935 is less than the CurrentMinCost. In its first iteration through 940, the process 900 identifies the first selected Lcore as the Lcore with the lowest cost for the port because CurrentMinCost is set to a very large value. In other iterations, the process 900 may or may not identify the Lcore selected for that iteration as the Lcore with the lowest cost because the cost of this Lcore might not be lower than the cost of previously examined Lcores.

At 945, the process determines whether it has examined all the available Lcores that have sufficient capacity to service the load on the port. If not, the process returns to 910 to select another available Lcore and then to repeat the operations 915-940 for this Lcore. When the process 900 determines that it has examined all the available Lcores that have sufficient capacity to service the load on the port, it identifies (at 950) the currently identified Lcore with the lowest cost as the best Lcore for the port. After 950, the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
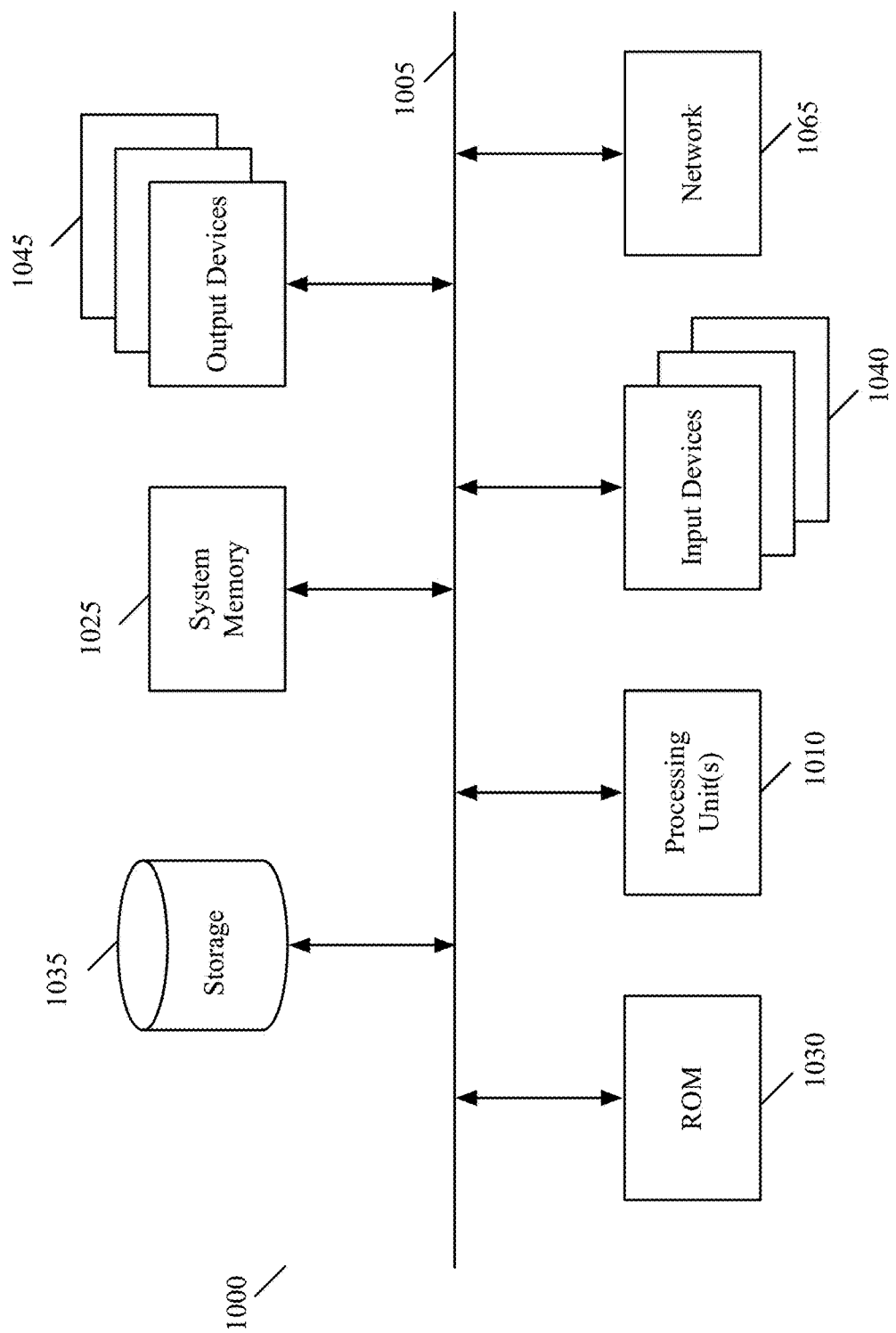
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims

We claim:

1. A method of performing layer 2 (L2) packet processing operations on a host computer on which a software switch with a plurality of ports executes, the L2 packet processing operations for forwarding packets in a network to which the host computer connects, the method comprising:
    defining a plurality of L2 packet-processing threads, each thread for execution by one processing unit of the host computer;
    assigning each of the plurality of ports of the software switch to one L2 packet-processing thread, the plurality of ports comprising a first set of ports for communicating with physical network interface controllers (PNICs) of the host computer and a second set of ports for communicating with virtual network interface controllers (VNICs) of virtual machines (VMs) on the host computer; and
    directing the L2 packet-processing thread associated with each port to poll the port to obtain packets received by the port in order to perform L2 packet processing to forward the obtained packets, wherein L2 packet-processing comprises a series of operations based on a stored set of forwarding rules.

2. A method of performing layer 3 (L3) packet processing operations on a host computer on which a software switch with a plurality of ports executes, the L3 packet processing operations for forwarding packets in a network to which the host computer connects, the method comprising:
    defining a plurality of L3 packet-processing threads, each thread for execution by one processing unit of the host computer;
    assigning each of the plurality of ports of the software switch to one L3 packet-processing thread, the plurality of ports comprising a first set of ports for communicating with physical network interface controllers (PNICs) of the host computer and a second set of ports for communicating with virtual network interface controllers (VNICs) of virtual machines (VMs) on the host computer; and
    directing the L3 packet-processing thread associated with each port to poll the port to obtain packets received by the port in order to perform L3 packet processing to forward the obtained packets, wherein L3 packet-processing comprises a series of operations based on a stored set of forwarding rules.

3. The method of claim 1, wherein each processing unit a core of a multi-core processor.

4. The method of claim 3, wherein a first plurality of processor cores are assigned to packet-processing threads, while a second plurality of processor cores are assigned to machines executing on the host computer, the machines comprising at least one of virtual machines or containers.

5. The method of claim 1, wherein the packet-processing threads are instantiated processes of the software switch.

6. The method of claim 1 further comprising re-assigning at least one port from one packet-processing thread to another packet-processing thread.

7. The method of claim 6, wherein re-assigning the port comprises performing a dynamic load processing operation to distribute the load on the packet-processing threads.

8. The method of claim 1, wherein directing the packet-processing thread to poll an associated port comprises directing the packet-processing thread to periodically poll the port.

9. The method of claim 1, wherein the packet-processing threads are fast path kernel threads.

10. A non-transitory machine readable medium storing a program which when executed by a set of processing units processes packets on a host computer on which a software forwarding element (SFE) with a plurality of ports executes, the program comprising sets of instructions for:
    defining a plurality of L2 packet-processing threads, each thread for execution by one processing unit of the host computer;
    assigning each of the plurality of ports of the SFE to one L2 packet-processing thread, the plurality of ports comprising a first set of ports for communicating with physical network interface controllers (PNICs) of the host computer and a second set of ports for communicating with virtual network interface controllers (VNICs) of virtual machines (VMs) on the host computer; and
    directing the L2 packet-processing thread associated with each port to poll the port to obtain packets received by the port in order to perform L2 packet processing to forward the obtained packets, wherein L2 packet-processing comprises a series of operations based on a stored set of forwarding rules.

11. A non-transitory machine readable medium storing a program which when executed by a set of processing units processes packets on a host computer on which a software forwarding element (SFE) with a plurality of ports executes, the program comprising sets of instructions for:

defining a plurality of L3 packet-processing threads, each thread for execution by one processing unit of the host computer;

assigning each of the plurality of ports of the SFE to one L3 packet-processing thread, the plurality of ports comprising a first set of ports for communicating with physical network interface controllers (PNICs) of the host and a second set of ports for communicating with virtual network interface controllers (VNICs) of virtual machines (VMs) on the host computer; and directing the L3 packet-processing thread associated with each port to poll the port to obtain packets received by the port in order to perform L3 packet processing to forward the obtained packets, wherein L3 packet-processing comprises a series of operations based on a stored set of forwarding rules.

12. The non-transitory machine readable medium of claim 10, wherein each processing unit is a core of a multi-core processor.

13. The non-transitory machine readable medium of claim 12, wherein a first plurality of processor cores are assigned to packet-processing threads, while a second plurality of processor cores are assigned to machines executing on the host computer, the machines comprising at least one of virtual machines or containers.

14. The non-transitory machine readable medium of claim 10, wherein the packet-processing threads are instantiated processes of the SFE.

15. The non-transitory machine readable medium of claim 10, wherein the program further comprises a set of instructions for re-assigning at least one port from one packet-processing thread to another packet-processing thread.

16. The non-transitory machine readable medium of claim 15, wherein the set of instructions for re-assigning the port comprises a set of instructions for performing a dynamic load processing operation to distribute the load on the packet-processing threads.

17. The non-transitory machine readable medium of claim 10, wherein the set of instructions for directing the packet-processing thread to poll an associated port comprises a set of instructions for directing the packet-processing thread to periodically poll the port.

18. The non-transitory machine readable medium of claim 10, wherein the packet-processing threads are fast path kernel threads.

* * * * *